US012661541B2

(12) United States Patent
Perez et al.

(10) Patent No.: US 12,661,541 B2
(45) Date of Patent: Jun. 23, 2026

(54) FLUORINE-FREE FIREFIGHTING FOAMS CONTAINING ONE OR MORE BIOPOLYMERS

(71) Applicant: PERIMETER SOLUTIONS LP, St. Louis, MO (US)

(72) Inventors: Covadonga Perez, Mieres (ES); Pamela Havelka-Rivard, De Pere, WI (US); Javier Castro, Mieres (ES); Mark Siem, Suamico, WI (US); Mitch Hubert, Menominee, MI (US); Robert Paulick, Green Bay, WI (US); Melissa Kim, Ontario, CA (US); LeiLei Zhang, Green Bay, WI (US)

(73) Assignee: PERIMETER SOLUTIONS LP, Saint Louis, MO (US)

( * ) Notice: Subject to any disclaimer, the term of this patent is extended or adjusted under 35 U.S.C. 154(b) by 0 days.

(21) Appl. No.: 17/516,097

(22) Filed: Nov. 1, 2021

(65) Prior Publication Data

US 2022/0134158 A1 May 5, 2022

Related U.S. Application Data

(60) Provisional application No. 63/108,216, filed on Oct. 30, 2020.

(51) Int. Cl.

| | |
|---|---|
| ***A62D 1/02*** | (2006.01) |
| ***A62C 3/06*** | (2006.01) |
| ***A62C 99/00*** | (2010.01) |

(52) U.S. Cl.

CPC .............. *A62D 1/0071* (2013.01); *A62C 3/06* (2013.01); *A62C 99/0036* (2013.01); *A62D 1/0078* (2013.01)

(58) Field of Classification Search

CPC ...... A62D 1/00; A62D 1/0071; A62D 1/0078; A62D 1/0028; A62D 1/0035; A62D 1/0041; A62D 1/005; A62C 3/06; A62C 3/065; A62C 5/02; A62C 5/022; A62C 5/027; A62C 99/00; A62C 99/0009; A62C 99/0036; A62C 99/009

See application file for complete search history.

(56) References Cited

U.S. PATENT DOCUMENTS

| | | | | |
|---|---|---|---|---|
| 3,634,234 | A * | 1/1972 | Morgenthaler | A62D 1/0035 252/7 |
| 3,929,649 | A | 12/1975 | Rossmy et al. | |
| 4,447,336 | A * | 5/1984 | Vandersall | A62D 1/0064 252/7 |
| 4,999,119 | A | 3/1991 | Norman et al. | |
| 5,207,932 | A | 5/1993 | Norman et al. | |
| 5,824,238 | A | 10/1998 | Garcia et al. | |
| 5,997,758 | A | 12/1999 | Barbarin et al. | |
| 6,586,483 | B2 | 7/2003 | Kolb et al. | |
| 9,259,602 | B2 * | 2/2016 | Robinet | A62D 1/0071 |
| 9,669,246 | B2 | 6/2017 | Bowen et al. | |
| 9,956,447 | B2 | 5/2018 | Martin et al. | |
| 9,956,448 | B2 | 5/2018 | Martin | |
| 10,173,089 | B2 | 1/2019 | Xie | |
| 10,214,680 | B2 | 2/2019 | Barati Ghahfarokhi | |
| 10,328,297 | B2 | 6/2019 | Bowen et al. | |
| 10,335,624 | B2 * | 7/2019 | Libal | A62D 1/0071 |
| 10,369,394 | B2 | 8/2019 | Bowen | |
| 10,369,395 | B2 | 8/2019 | Bowen et al. | |
| 10,518,120 | B2 * | 12/2019 | Pai | A62D 1/0042 |
| 10,653,910 | B2 | 5/2020 | Da Costa et al. | |
| 10,780,305 | B2 * | 9/2020 | Xie | A62D 1/0071 |
| 10,786,696 | B2 | 9/2020 | Libal et al. | |
| 10,870,030 | B2 | 12/2020 | Libal | |
| 11,065,490 | B2 | 7/2021 | LaVergne et al. | |
| 11,173,334 | B2 | 11/2021 | Xie et al. | |
| 11,305,143 | B2 | 4/2022 | Libal | |
| 11,338,162 | B2 | 5/2022 | Siem | |
| 2002/0128336 | A1 | 9/2002 | Kolb et al. | |
| 2003/0212177 | A1 | 11/2003 | Vandersall et al. | |
| 2005/0118106 | A1 | 6/2005 | Schaefer | |
| 2007/0034823 | A1 | 2/2007 | Hagquist et al. | |
| 2010/0276625 | A1 | 11/2010 | Mulligan et al. | |
| 2014/0138104 | A1 | 5/2014 | Robinet et al. | |
| 2016/0166867 | A1 | 6/2016 | Hansen et al. | |
| 2017/0056698 | A1 | 3/2017 | Pai et al. | |
| 2017/0368395 | A1 | 12/2017 | Da Costa et al. | |
| 2018/0361185 | A1 | 12/2018 | Siem | |
| 2019/0262647 | A1 * | 8/2019 | Havelka-Rivard | A62D 1/0071 |
| 2020/0025372 | A1 | 1/2020 | Cassidy | |
| 2020/0129402 | A1 | 4/2020 | Jamadagni et al. | |

(Continued)

FOREIGN PATENT DOCUMENTS

| | | | |
|---|---|---|---|
| CN | 111569349 | A | 8/2020 |
| WO | WO-2008076753 | A1 | 6/2008 |

(Continued)

OTHER PUBLICATIONS

Khoziaistvo, L., "Fire Extinguishing Solution OSB-1 for the Control of Forest Fires" (1983) pp. 59-60.

International Search Report and Written Opinion, issued Feb. 2, 2022, in International Application No. PCT/US21/57562PCT filed Nov. 1, 2021.

Hoskins, R.: Robb, I.D.: Williams, P.A.; Warren, P. Phase separation in mixtures of polysaccharides and proteins, J. Chem. Soc., Faraday Trans. 1996, 92, 4515-4520 (6 pages).

Croucher, M.D. et al. Effect of free volume on the steric stabilization of nonaqueous latex dispersions. J. Colloid Interface Sci. 1981, 81, 257-265 (9 pages).

(Continued)

*Primary Examiner* — Matthew R Diaz

(74) *Attorney, Agent, or Firm* — Harness, Dickey & Pierce, P.L.C.

(57) ABSTRACT

The present invention is directed to fluorine-free firefighting foams containing one or more biopolymers. The biopolymers of the compositions of the present invention include for example, diutan, guar, xanthan, scleroglucan, and combinations thereof.

16 Claims, No Drawings

(56) References Cited

U.S. PATENT DOCUMENTS

| | | | | |
|---|---|---|---|---|
| 2020/0179737 | A1 | 6/2020 | Dhau | |
| 2020/0215372 | A1* | 7/2020 | LaVergne ............. | A62D 1/0071 |
| 2020/0368570 | A1* | 11/2020 | Hodgen ............... | A62D 1/0064 |
| 2022/0134158 | A1 | 5/2022 | Havelka-Rivard et al. | |

FOREIGN PATENT DOCUMENTS

| | | | | |
|---|---|---|---|---|
| WO | 2012123778 | A1 | 9/2012 | |
| WO | WO-2015153843 | A1 | 10/2015 | |
| WO | WO-2017161156 | A1 | 9/2017 | |
| WO | WO-2018022763 | A1 * | 2/2018 | ........... A62D 1/0071 |
| WO | WO-2020102897 | A1 * | 5/2020 | ........... A62D 1/0014 |
| WO | WO-2020212591 | A1 | 10/2020 | |
| WO | WO-2021191706 | A1 * | 9/2021 | ........... A62D 1/0071 |
| WO | WO-2023164111 | A1 | 8/2023 | |

OTHER PUBLICATIONS

UL 162_169740026_1 , Foam Equipment and Liquid Concentrates, ISBN 1-55989-561-6, 50 Pages.

Sheng et al., “Thermal Stability of Gel Foams Stabilized by Xanthan Gum, Silica Nanoparticles and Surfactants”, https://doi.org/10.3390/gels7040179, 13 pages, Oct. 2021.

* cited by examiner

FLUORINE-FREE FIREFIGHTING FOAMS CONTAINING ONE OR MORE BIOPOLYMERS

CROSS-REFERENCE TO RELATED APPLICATION

The present application claims priority to U.S. Provisional Patent Application No. 63/108,216, filed Oct. 30, 2020, which is hereby incorporated by reference in its entirety for all relevant purposes.

FIELD OF THE INVENTION

The present invention is directed to fluorine-free firefighting foams containing one or more biopolymers. The biopolymers of the compositions of the present invention include for example, diutan, guar, xanthan, scleroglucan, and combinations thereof.

BACKGROUND OF THE INVENTION

Aqueous firefighting foams are used against Class B fires (i.e., fires fueled by flammable liquids). Such firefighting foams include both aqueous film-forming foams (AFFF) and alcohol-resistant aqueous film-forming foams (AR-ARFF). In recent years, due to toxicity concerns fluorine-free aqueous firefighting foams have been developed. Suitable fluorine-free foams have been developed, but opportunities exist for improvements in certain properties of the foams to provide enhanced performance. These properties include, for example, reduced foam coalescence, which provides longer drain times. The foams of the present invention are also suitable for preparing a shear thinning concentrate (e.g., having a target viscosity of from 3000 to 5000 centipoise (cps)). The fluorine-free foams of the present invention are also currently believed to provide improved polar fuel resistance, which allows for lower application rates, and are also currently believed to be highly foam forming and therefore suitable for use with non-aspirated sprinkler heads.

BRIEF SUMMARY OF THE INVENTION

Briefly, therefore, the present invention is directed to fire-fighting foam compositions for fighting Class B fires.

In various embodiments, the composition comprises diutan gum, an anionic surfactant, a zwitterionic surfactant, and an organic solvent, wherein the composition is free of fluorinated surfactants, nonionic surfactants, and fluorine-containing polymers.

In other embodiments, the composition comprises a first biopolymer, or polysaccharide selected from the group consisting of diutan gum, scleroglucan, and combinations thereof; a second biopolymer, polysaccharide selected from the group consisting of guar gum, cellulose, micro-fibrillated cellulose (MFC), and combinations thereof; and a third biopolymer, or polysaccharide selected from the group consisting of xanthan gum, rhamsam gum, gellan, and combinations thereof, wherein the composition is free of fluorinated surfactants and fluorine-containing polymers.

In further embodiments, the composition comprises a first biopolymer, or polysaccharide selected from the group consisting of diutan gum, scleroglucan, and combinations thereof; a second biopolymer, or polysaccharide selected from the group consisting of guar gum, cellulose, micro-fibrillated cellulose (MFC), and combinations thereof; and a third biopolymer, or polysaccharide selected from the group consisting of xanthan gum, rhamsam gum, gellan and combinations thereof, wherein the combined proportion of the first biopolymer (polysaccharide), second biopolymer (polysaccharide), and third biopolymer (polysaccharide) is less than about 5.0 wt. % of the composition.

In still further embodiments, the composition comprises diutan gum in a proportion of from about 0.1 to about 1.2 wt. % of the composition; guar gum in a proportion of from about 0.1 to about 0.4 wt. % of the composition; xanthan gum in a proportion of from about 0.1 to about 3.5 wt. % of the composition; an anionic surfactant, wherein the anionic surfactant is selected from the group consisting of alkyl sulfates, alkyl ether sulfates, sulfosuccinates, and combinations thereof and is present in a proportion of from about 0.5 to about 30 wt. % of the composition; and an organic solvent, wherein the organic solvent is selected from the group consisting of glycols, alcohols, glycol ethers, and combinations thereof and is present in a proportion of from about 0.5 to about 25 wt. % of the composition, wherein the composition is free of fluorinated surfactants.

In still other embodiments, the composition comprises one or more biopolymers selected from the group consisting of diutan gum, guar gum, xanthan gum, scleroglucan, cellulose, protein, and combinations thereof; an anionic surfactant, wherein the anionic surfactant is selected from the group consisting of alkyl sulfates, alkyl ether sulfates, sulfosuccinates and combinations thereof; and an organic solvent, wherein the organic solvent is selected from the group consisting of glycols, alcohols, glycol ethers and combinations thereof; wherein: the weight ratio of 20 to 28 is from about 7:1 to about 11:1; and/or the weight ratio of 4 to 32 is from about 1:1 to about 12:1.

In various of the above embodiments and other embodiments described herein, the composition further comprises water.

The present invention is further directed to methods for suppressing and/or extinguishing a Class-B fire.

Other objects and features will be in part apparent and in part pointed out hereinafter.

DETAILED DESCRIPTION OF THE INVENTION

The present invention is directed to aqueous, fluorine-free firefighting foams containing one or more biopolymers. In accordance with the present invention it has been discovered that foams exhibiting improved performance based on selection of a particular biopolymer or a particular combination of biopolymer can be prepared. Further, it has been discovered that a lower proportion of biopolymer(s) may be utilized in the present compositions.

The firefighting compositions of the present invention include water, one or more gums, an organic solvent and one or more surfactants. Various other additives may be included in the compositions as well. The compositions of the present invention are free from fluorine, in particular fluorine-containing surfactants and fluorinate-containing polymers.

Biopolymer(s)

The compositions of the present invention include one or more biopolymers, which serve one or more functions. One function of the biopolymer is to form vapor barriers on the surface of the fuels. They also modify viscosity of the compositions and are also shear thinning.

In accordance with the present invention it has been discovered that the selection of the biopolymer can allow for use of a relatively low proportion thereof. Typically, the total proportion of biopolymer(s) included in the composition is less than about 5 wt %, less than about 4 wt %, less than about 3.5 wt %, less than about 3 wt %, or less than about 2.5 wt %. Often, the total proportion of biopolymer in the composition is from about 0.1 to about 5 wt %, from about 1 wt % to about 4 wt %, or from about 2 wt % to about 2.5 wt %.

Where containing multiple biopolymers the compositions of the present invention can be described as including a first biopolymer and a second biopolymer, or a first biopolymer, a second biopolymer, and a third biopolymer. In various embodiments each of the biopolymers is a polysaccharide, thus the composition includes a first polysaccharide, a second polysaccharide, and a third polysaccharide. Typically, each biopolymer is present in a proportion of less than about 1.5 wt % or less than about 1 wt %.

In certain embodiments, a first polysaccharide (e.g., diutan gum) is present in a proportion of from about 0.1 wt % to about 1.5 wt % (e.g., from about 0.1 wt % to about 1.2 wt %), a second polysaccharide (e.g., guar gum) is present in a proportion of from about 0.1 wt % to about 0.5 wt %. (e.g., from about 0.1 wt % to about 0.4 wt %), and a third polysaccharide (e.g., xanthan gum) is present in a proportion of from about 0.1 wt % to about 3.5 wt % (e.g., from about 0.5 wt % to about 1.5 wt %) of the composition.

Suitable biopolymers (i.e., stabilizers and/or viscosity modifiers) include alginate, acacia, agar, carrageenan, gellan gum, guar gum, inulin, konjac, locust bean gum, pectin, tara gum, alginate, carboxymethylcellulose (CMC), xanthan, carrageenan, diutan gum, gellan gum, locust bean gum, scleroglucan, chitin, modified guar gum, casein, and combinations thereof.

In certain embodiments, the composition includes one or more biopolymers selected from the group consisting of diutan, guar gum, xanthan, scleroglucan, welan gum, konjac gum, and combinations thereof. In various embodiments, the composition comprises guar gum, or a derivative thereof (e.g., hydroxypropylguar and carboxymethyl hydroxypropyl guar gum) as one of the biopolymers. In these and other embodiments, the composition may contain a cellulose biopolymer (e.g., microfibrillated cellulose, hydroxyethyl cellulose, and hydroxypropylmethyl cellulose).

Other suitable stabilizers, viscosity modifiers, and film formers include silk fibroin, gelatin, starch, cellulose, collagen, citrus fiber, whey protein, micro-fibrillated cellulose, clays, silica, and combinations thereof.

In various embodiments, the viscosity modifier or film former is selected from the group consisting of diutan gum, guar gum, xanthan gum, scleroglucan, cellulose, whey protein, and combinations thereof.

In certain embodiments, it is currently believed the particular combination of biopolymers and performance of its substituents provides performance improvements. For example, diutan gum is believed to provided improved nonpolar fuel performance, while xanthan gum forms a vapor barrier on polar fuels and the inclusion of guar gum allows for use of a lower proportion of xanthan gum. Additionally, it is currently believed that guar gum and xanthan gum interact in a synergistic fashion to improve fire extinguishment and increase burnback resistance.

Organic Solvent

Suitable organic solvents include alkyl glycols, polyols, and glycol ethers. Exemplary alkyl glycol diols include propylene glycol, butyl glycol, neopentyl glycol, ethylene glycol, 2-methyl-2,4-pentanediol, and combinations thereof. In accordance with certain embodiments, the organic solvent is an alkyl glycol diol selected from propylene glycol, butyl glycol, ethylene glycol, and combinations thereof. In certain embodiments, the organic solvent is butyl glycol. In still further embodiments, the organic solvent is an alley glycol triol including, for example, glycerine.

Further in accordance with the present invention, the organic solvent may be a glycol ether. Suitable glycol ethers include propylene, n-butyl glycol ether, dipropylene glycol n-propyl ether, dipropylene glycol n-butyl ether, propylene glycol n-butyl ether, propylene glycol n-propyl ether, tripropylene glycol n-butyl ether, propylene glycol phenyl ether, dipropylene glycol phenyl ether, dipropylene glycol dimethyl ether, propylene glycol methyl ether, propylene glycol methyl ether acetate, dipropylene glycol methyl ether, dipropylene glycol methyl ether acetate, tripropylene glycol methyl ether, ethylene glycol hexyl ether; diethylene glycol hexyl ether; ethylene glycol propyl ether; diethylene glycol phenyl ether, ethylene glycol phenyl ether, poly(oxy-1,2-ethanediyl), alphaphenyl-omegahydroxy, diethylene glycol ethyl ether, diethylene glycol n-butyl ether, ethylene glycol n-butyl ether, butyl carbitol, and combinations thereof. In certain embodiments, the glycol ether is selected from the group consisting of propylene glycol, n-butyl glycol ether, butyl glycol, butyl carbitol, and combinations thereof.

In various embodiments, the organic solvent is selected from the group consisting of glycols, alcohols, glycol ethers, and combinations thereof. In certain embodiments, the compositions include two organic solvents. Suitable alcohols may include butanol and/or octanol, which may function as freeze point depressants.

Typically, the compositions contain organic solvent(s) in a proportion of at least about 10 wt %, at least about 15 wt %, or at least about 20 wt %. Often, the organic solvent(s) is present in a proportion of from about 0.5 wt % to about 30 wt %, from about 0.5 wt % to about 25 wt %, from about 10 wt % to about 25 wt % or from about 10 wt % to about 20 wt %.

Surfactants

The compositions of the present invention include one or more surfactants, typically an anionic surfactant selected from alkyl sulfates, alkyl ether sulfates (e.g., those having a degree of ethoxylation of from 1 to 3 moles), sulfosuccinates, and combinations thereof.

Suitable alkyl sulfates include sodium or amine $C_8$-$C_{16}$ octyl sulfate, decyl sulfate, lauryl sulfate, sodium lauryl sulfoacetate, alpha olefin sulfonate (14-16). In various embodiments, the composition includes an alkyl sulfate selected from the group consisting of decyl sulfate, lauryl sulfate, octyl sulfate, and combinations thereof.

Suitable alkylether sulfates include sodium laureth sulfate and sodium $C_8$-$C_{14}$ ammonium laureth sulfate.

Suitable sulfosuccinates include $C_8$-$C_{16}$ disodium laureth sulfosuccinate, sodium dioctyl sulfosuccinate, sodium bistridecyl sulfosuccinate, disodium ethoxylated alcohol half ester of sulfosuccinic acid, sodium diisopropyl naphthalene sulfonate. In various embodiments, the composition includes a sulfosuccinate selected from sodium dioctyl sulfosuccinate and $C_8$-$C_{16}$ disodium laueth sulfosuccinate.

In various embodiments, the composition includes more than one anionic surfactant, for example, one or more surfactants selected from alkyl sulfates, alkyl ether sulfates, sulfosuccinates, and combinations thereof. In certain embodiments, the composition includes decyl sulfate, and octyl sulfate, and lauryl sulfate.

Further in accordance with the present invention, the composition can include a zwitterionic surfactant selected from sultaines and betaines. Suitable sultaines include cocamidopropyl hydroxysultaine and lauramidopropyl hydroxysultaine. In certain embodiments, the composition includes cocamidopropyl hydroxysultaine. Suitable betaines include cocamidopropyl betaine, lauramidopropyl betaine, disodium lauriminodipropionate, octyliminodipropionate, and combinations thereof. In various embodiments, the composition includes more than one zwitterionic surfactant (e.g., cocoamidopropyl hydroxysultaine and cocamidopropyl betaine). In still other embodiments, the composition comprises a C12 betaine surfactant and one of the suitable sultaine surfactants listed above.

Further in accordance with the present invention in various embodiments, the composition includes a surfactant (e.g., an anionic surfactant) while not including a nonionic surfactant. Since nonionic surfactants tend to aggregate in high saline or high electrolyte solutions, removing the nonionic surfactants is currently believed to improve the overall stability of the foam concentrates under certain conditions.

Typically, the total proportion of surfactant is at least about 5 wt %, at least about 10 wt %, or at least about 15 wt % of the composition. Often, the total proportion of surfactant is from about 0.1 wt % to about 20 wt %, from about 1 wt % to about 20 wt %, from about 5 wt % to about 20 wt % or from about 10 wt % to about 20 wt %.

Additional Components

In addition to the above components, the compositions may also include inorganic bridging ligands as a viscosity modifier. Suitable such components include magnesium sulfate, magnesium chloride, sodium chloride, potassium chloride, iron sulfate, iron chloride, and combinations thereof.

The compositions of the present invention may also include a foam stabilizer selected from $C_{12}$-$C_{18}$ amines, sorbitan esters, $C_4$-$C_{20}$ alcohols, polysorbates, fatty acids, and combinations thereof.

Further in accordance with the present invention, the composition may include a polyol such as a sugar alcohol selected from the group consisting of fructose, galactose, dextrose, sucrose, maltose, lactose, xylose, glucose, and combinations thereof as a foam stabilizer. In various embodiments, the polyol is selected from the group consisting of sucrose, xylose, dextrose, and combinations thereof.

Compositions of the present invention may further include a preservative (e.g., tolytriazole).

Overall, in accordance with the present invention the weight ratio of total proportion of biopolymer(s) to surfactant is from about 1:5 to about 1:10 (e.g., from about 1:7 to about to about 1:10).

The weight ratio of the total proportion of biopolymer(s) to organic solvent is typically from about 1:0.5 to about 1:1.

The weight ratio of the total proportion of biopolymer(s) to any alcohol component (e.g., as a foam stabilizer) is typically from about 1:4 to about 1:10 (e.g., from about 1:5 to about 1:10).

There are a variety of suitable water sources, including fresh water, salt water, municipal water, and brackish water. Typically, water constitutes from about 30 wt % to about 65 wt %, from about 35 wt % to about 60 wt %, or from about 40 wt % to about 55 wt % of the composition.

The compositions of the present invention are typically in the form of a concentrate and provided in equipment suitable for generation of foam. Suitable foam generating equipment includes aspirated foam generating devices, non-aspirated foam generating devices foam chambers, and sprinkler systems.

Foams of the present invention can be applied directly or indirectly to or onto a Class-B fire or directly or indirectly to or onto the fuel ahead of a potentially advancing Class-B fire front.

Having described the invention in detail, it will be apparent that modifications and variations are possible without departing from the scope of the invention defined in the appended claims.

Example 1

Compositions containing one or more of xanthan, guar and/or diutan gum as biopolymers including the following additional components (e.g., one or more of the listed surfactant(s) at the listed concentration(s) in accordance with the following were prepared):

| Component | wt. % |
|---|---|
| Water | 38-61% |
| Diutan | 0.3-1.2% |
| Guar | 0-0.3% |
| Xanthan | 0.7-1.2% |
| Anionic C6-C18 | 0-7% |
| Anionic C9-C15 Alkyl Ether Sulfate | 0-15% |
| Anionic C8-C12 Succinate Salt | 0-2.3% |
| C8-C18 Zwitterionics | 3-11% |
| C8-C18 Hydroxysultaine | 0-11% |
| Propylene Glycol | 0-22% |
| Diethylene Glycol Butyl Ether | 0-12% |
| C5-C12Polyol | 0-18% |
| C10-C16 Fatty Alcohol | 0.8-1.5% |
| Preservative 0-0.2% | 0-0.2% |
| Total | 100.00% |

Example 2

Compositions containing one or more of xanthan, guar and/or diutan gum as biopolymers including the following additional components (e.g., one or more of the listed surfactant(s) at the listed concentration(s) in accordance with the following were prepared). These compositions did not contain water.

| Component | wt. % |
|---|---|
| Diutan | 0.7-2.1% |
| Guar | 0-0.6% |
| Xanthan | 0.7-2.1% |
| Anionic C6-C18 | 0-31% |
| Anionic C9-C15 Alkyl Ether Sulfate | 0-39% |
| C8-C18 Hydroxysultaine | 0-20% |
| C8-C18 Zwitterionics | 0-20% |
| Diethylene Glycol Butyl Ether | 0-10% |
| C10-16 Fatty Alcohol | 7-9% |
| Total | 100.00% |

Example 3

Compositions containing welan gum and/or diutan gum as biopolymers including the following additional components (e.g., one or more of the listed surfactant(s) at the listed concentration(s) in accordance with the following were prepared).

| Chemical Name | wt. % |
|---|---|
| glycol ether solvent | 8-10% |
| Welan Gum | 0-1.6% |
| Diutan Gum | 0-0.9% |
| C5-C12Polyol | 0-18% |
| C10-C18 sulfate | 5-7% |
| Ethoxylated sulfate C8-C16 | 3-5% |
| C8-C22 Zwitterionics | 0-8% |
| C8-C22 sultaine | 0-8% |
| Silicon surfactant | 0-3.0% |
| Liner or branched alcohol C8-C16 | 0-1.3% |
| Preservative | 0-0.2% |
| Water | 60-75% |
| Total | 100.00% |

Example 4

Compositions containing xanthan, diutan gum and/or konjac as biopolymers including the following additional components (e.g., one or more of the listed surfactant(s) at the listed concentration(s) in accordance with the following were prepared).

| Chemical Name | wt. % |
|---|---|
| glycol ether solvent | 4-30% |
| Xanthan | 0.6-2.0% |
| Diutan | 0-0.2% |
| Konjac | 0.1-0.5% |
| C10-C18 sulfate | 1-15% |
| C8-C22 Zwitterionics | 0-2% |
| Propylene Glycol | 0-8% |
| Liner or branched alcohol C8-C16 | 0.65-1.3% |
| Preservative | 0-0.2% |
| Water | 25.5-68% |
| Total | 100.00% |

Example 5

Compositions containing xanthan, diutan gum, guar gum, and/or microfibrillated cellulose as biopolymers including the following additional components (e.g., one or more of the listed surfactant(s) at the listed concentration(s) in accordance with the following were prepared).

| Chemical Name | wt. % |
|---|---|
| glycol ether solvent | 8-10% |
| Xanthan | 0.6-2.0% |
| Diutan | 0-0.2% |
| Guar | 0.5-1% |
| Cellulose | 33.5-55% |
| C10-C18 sulfate | 0.6-2% |
| C8-C22 Zwitterionics | 22-40% |
| Propylene Glycol | 8-15% |
| Liner or branched alcohol C8-C16 | 0.65-1.35% |
| Preservative | 0-0.2% |
| Water | 25.5-68% |
| Total | 100.00% |

Example 6

Compositions containing diutan gum, hydroxyethyl cellulose and/or hydroxypropylmethyl cellulose as biopolymers including the following additional components (e.g., one or more of the listed surfactant(s) at the listed concentration(s) in accordance with the following were prepared).

| Chemical Name | wt. % |
|---|---|
| glycol solvents | 12-22% |
| Glycerine | 0-15 |
| Diutan | 0-0.7% |
| Cellulose | 0.22-1.3% |
| Linear alcohol C12 | 1.35% |
| C8-C12 alkylsulfate | 1.4-2.1% |
| C12 Zwitterionics | 18% |
| Preservative | 0-0.2% |
| Water | 50-70 |
| Total | 100.00% |

Example 7

Compositions containing diutan gum, hydroxyethyl cellulose and/or hydroxypropylmethyl cellulose as biopolymers including the following additional components (e.g., one or more of the listed surfactant(s) at the listed concentration(s) in accordance with the following were prepared).

| Chemical Name | wt. % |
|---|---|
| glycol solvents | 14-16% |
| Diutan | 0.5-0.62% |
| Cellulose | 0.08-0.2% |
| Linear alcohol C12 | 1.35% |
| C8-C12 alkylsulfate | 2.1% |
| C12 Zwitterionics | 18% |
| Preservative | 0-0.2% |
| Water | 50-70 |
| Total | 100.00% |

Example 8

The following Example provides First Test Data for compositions of the present invention.

| Formulation | Fuel | Water Type | Rate Flow GPM | Expansion | 25% Drain Time (min:sec) | 90% Control (min:sec) | 99% Control (min:sec) | Extinguishment (min:sec) | BurnBack (min:sec) |
|---|---|---|---|---|---|---|---|---|---|
| 65R | Heptane | Fresh | 3.0 | 7.1 | 21:45 | 1:01 | 1:43 | 2:18 | — Fail |
| 65R | IPA | Fresh | 7.4 | 6.9 | 20:50 | 1:40 | 2:50 | 3:15 | SE @ 3 sec |
| 2020-01-119 | Heptane | Fresh | 3.0 | 6.3 | 105:60 | 1:15 | 1:40 | 2:19 | SE @ 15 sec |
| 2020-01-119 | Methanol | Fresh | 3.0 | 7.2 | 68:24 | 1:03 | 2:10 | 3:40 | SE @ 3 sec |
| 2020-01-119 | IPA | Fresh | 5.0 | 7.0 | 123:60 | 2:28 | 3:31 | 4:06 | SE @ 8 sec |
| 2020-01-119/132 | IPA | Fresh | 7.2 | 6.5 | 96:32 | 1:23 | 2:20 | 2:33 | SE @ 3 sec |

-continued

| Formulation | Fuel | Water Type | Rate Flow GPM | Expansion | 25% Drain Time (min:sec) | 90% Control (min:sec) | 99% Control (min:sec) | Extinguishment (min:sec) | BurnBack (min:sec) |
|---|---|---|---|---|---|---|---|---|---|
| 2020-01-119/132 | IPA | Fresh | 5.0 | 7.0 | 123:60 | 2:28 | 3:31 | 4:06 | SE @ 8 sec |
| 2020-01-119A | IPA | Fresh | 5.0 | 7.4 | 67:15 | 2:28 | 3:31 | 4:06 | Pass 10% @ 5 min |
| 2020-01-132 | Heptane | Fresh | 3.0 | 6.6 | 74:10 | 1:04 | 1:25 | 1:50 | SE @ 21 sec |
| 2020-01-140 | Heptane | Fresh | 3.0 | 6.9 | 29:51 | 1:07 | 1:40 | 1:50 | Fail @2:30 |
| 2020-01-141 | Heptane | Fresh | 3.0 | 7.3 | 45:00 | 1:03 | 1:50 | 2:03 | Fail @4:30 |
| 2020-01-142 | Heptane | Fresh | 3.0 | 7.2 | 61:43 | 1:02 | 1:35 | 1:45 | SE @ 23 sec |
| 2020-01-142 | IPA | Fresh | 5.0 | 7.1 | 60:48 | 2:10 | 3:45 | 4:05 | Pass 5% @ 5 min |

2020-01-213 Series

| Formulation | Fuel | Water Type | Flow Rate GPM | Expansion | 25% Drain Time (min:sec) | 90% Control (min:sec) | 99% Control (min:sec) | Extinguishment (min:sec) | BurnBack (min:sec) |
|---|---|---|---|---|---|---|---|---|---|
| 2020-01-213 | Heptane | Fresh | 3.0 | 6.0 | 8:35 | — | — | — | — |
| 2020-01-213 | IPA | Fresh | 5.0 | 7.1 | 24:30 | 3:05 | 4:31 | 5:41 | — |
| 2020-01-216A | Heptane | Fresh | 3.0 | 7.3 | 25:30 | 1:08 | 1:25 | 1:58 | — |
| 2020-01-216A | IPA | Fresh | 5.0 | 7.5 | 35:30 | — | — | — | — |
| 2020-01-249 | Heptane | Fresh | 3.0 | 7.3 | 25:30 | 1:02 | 1:30 | 1:50 | SE @ 26 sec |
| 2020-01-251 | Heptane | Fresh | 3.0 | 6.5 | 53:30 | 1:10 | 1:16 | 1:55 | SE @ 41 sec |
| 2020-01-255 | Heptane | Fresh | 3.0 | 6.5 | 53:30 | 0:54 | 1:18 | 1:36 | SE @ 23 sec |
| 2020-01-255 | IPA | Fresh | 6.2 | 7.2 | 64:10 | 2:15 | 3:21 | 4:06 | Pass 10% @ 5 min |
| 2020-01-277 | Heptane | Fresh | 3.0 | 7.0 | 57:17 | 1:03 | 1:32 | 2:00 | Pass 15% @ 5 min |
| 2020-01-277 | IPA | Fresh | 6.0 | 6.1 | 43:48 | 1:58 | 2:29 | 3:41 | Pass 2% @ 5 min |
| 2020-01-290/A108 | Heptane | Fresh | 3.0 | 7.0 | 66:30 | 1:00 | 1:30 | 1:59 | SE @ 21 sec |
| 2020-01-290/A108 | IPA | Fresh | 6.0 | | | | | | |

80-10 Series

| Formulation | Fuel | Water Type | Flow Rate | Expansion | 25% Drain Time | 90% Control | 99% Control | Extinguishment | BurnBack |
|---|---|---|---|---|---|---|---|---|---|
| 80-10 | Heptane | Fresh | 3.0 | 6.9 | 123:08 | 1:10 | 1:30 | 1:45 | SE @ 11 sec |
| 80-10 | Heptane | Salt | 3.0 | 6.2 | 96:06 | 1:02 | 1:30 | 1:43 | SE @ 10 sec |
| 80-10F | IPA | Fresh | 5.5 | 8.5 | 110:10 | 3:10 | 5:00 | 5:45 | — |
| 80-10F | IPA | Salt | 5.5 | 5.5 | 65:50 | 3:00 | 4:40 | 5:45 | — |
| 80-10F | IPA | Fresh | 6.0 | 8.5 | 90:10 | 3:10 | 3:35 | 3:50 | Pass 6% @ 5 min |
| 80-10F | IPA | Salt | 6.0 | 5.5 | 65:50 | 2:30 | 3:40 | 4:18 | Pass 17% @ 5 min |

Sprinkler Testing

| Formulation | Fuel | Grid | Flow Rate GPM | k factor | Application Rate | 90% Control (min:sec) | 99% Control (min:sec) | Extinguishment (min:sec) | Burnback (min:sec) |
|---|---|---|---|---|---|---|---|---|---|
| 2020-01-213 | Heptane | UL | 96.0 | 11.2 | 0.16 | — | 5:00 | Failed | |
| 2020-01-213 | Heptane | UL | 180.0 | 11.2 | 0.3 | 1:45 | 1:55 | 2:00 | Fail Deluge |
| 2020-01-213 | IPA | UL | 260.0 | 11.2 | 0.4 | 3:15 | 3:25 | 3:30 | SE @ 5 sec |
| 2020-01-213 | Heptane | FM | 160.0 | 11.2 | 0.4 | 1:20 | 1:30 | 1:45 | Fail Deluge |
| 2020-01-213 | IPA | FM | 160.0 | 11.2 | 0.4 | 1:30 | — | Failed | |
| 2020-01-213 | IPA | FM | 240.0 | 11.2 | 0.6 | 1:30 | 1:55 | 2:10 | SE @ 5 sec |
| 2020-01-255 | Heptane | FM | 120.0 | 11.2 | 0.3 | 4:55 | — | Failed | |
| 2020-01-255 | IPA | FM | 200.0 | 11.2 | 0.5 | 2:30 | 2:55 | 2:58 | SE @ 2 sec |
| 80-10F | Heptane | FM | 120.0 | 8.0 | 0.3 | 1:30 | 1:55 | 2:02 | Fail Deluge* |
| 39-25 | IPA | FM | 160.0 | 11.2 | 0.4 | 1:09 | 1:51 | 1:59 | SE @ 2 sec |
| 39-25 | Heptane | FM | 120.0 | 11.2 | 0.3 | 1:18 | 2:34 | 2:44 | 7:00 |

| Agent | Extinguishment Time |
|---|---|
| UL Listed 3x3 | Did not extinguish |
| −142 | 3:06 |
| −132 | Did not extinguish |
| −190 | Did not extinguish |
| 65R | Did not extinguish |
| A108 | Did not extinguish |

The plunging test is a 9.5 soft fire that's conducted using premium gasoline with an application rate of about 0.5 gallons per minute (gpm) for 3 minutes When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions without departing from the scope of the invention, it is intended that all matter contained in the above description shall be interpreted as illustrative and not in a limiting sense.

What is claimed is:

1. A fire-fighting foam composition for fighting a Class B fire, the composition comprising:

a plurality of biopolymers comprising diutan gum, guar gum, and xanthan gum, wherein the combined proportion of the plurality of biopolymers is from about 2 wt % to about 2.5 wt % of the composition;

an anionic surfactant, wherein the anionic surfactant is selected from the group consisting of alkyl sulfates, alkyl ether sulfates, sulfosuccinates and combinations thereof; and an organic solvent, wherein the organic solvent is selected from the group consisting of glycols, alcohols, glycol ethers and combinations thereof; wherein:

the weight ratio of the anionic surfactant to the plurality of biopolymers is from about 7:1 to about 11:1;

the weight ratio of the plurality of biopolymers to organic solvent is from about 1:1 to about 1:12, and the composition is free of fluorinated surfactants and fluorine-containing polymers.

2. The composition of claim 1, wherein the anionic surfactant comprises an alkyl ether sulfate selected from the group consisting of sodium laureth sulfate, sodium $C_8$-$C_{14}$ ammonium laureth sulfate, and combinations thereof.

3. The composition of claim 1, wherein the anionic surfactant is selected from the group consisting of sodium dioctyl sulfosuccinate, sodium bistridecyl sulfosuccinate, disodium ethoxylated alcohol half ester of sulfosuccinic acid, $C_8$-$C_{16}$ disodium laureth sulfosuccinate, and combinations thereof.

4. The composition of claim 1, wherein the anionic surfactant is selected from the group consisting of sodium laureth sulfate, sodium $C_8$-$C_{14}$ ammonium laureth sulfate, sodium dioctyl sulfosuccinate, sodium bistridecyl sulfosuccinate, disodium ethoxylated alcohol half ester of sulfosuccinic acid, $C_8$-$C_{16}$ disodium laureth sulfosuccinate, and combinations thereof; the composition further comprising:

one or more additional components selected from the group consisting of stabilizers, viscosity modifiers, and film formers.

5. The composition of claim 1, wherein the organic solvent is present in a proportion of from about 10 wt % to about 25 wt % of the composition.

6. The composition of claim 1, wherein the organic solvent is selected from alkyl glycols, glycol ethers, and combinations thereof.

7. The composition of claim 6, wherein the organic solvent is present in a proportion of from about 10 wt % to about 25 wt % of the composition.

8. The composition of claim 6, wherein the organic solvent is present in a proportion of from about 10 wt. % to about 20 wt. % of the composition.

9. The composition of claim 1, the composition further comprising water.

10. The composition of claim 9, wherein water constitutes from about 30 wt % to about 65 wt % of the composition.

11. The composition of claim 1, the composition further comprising a stabilizer, viscosity modifier, and/or film former.

12. The composition of claim 1, the composition further comprising a zwitterionic surfactant selected from sultaines and betaines.

13. The composition of claim 1, wherein the composition further comprises an inorganic bridging ligand as a viscosity modifier selected from magnesium sulfate, magnesium chloride, sodium chloride, potassium chloride, iron sulfate, iron chloride, and combinations thereof.

14. The composition of claim 1, wherein the composition further comprises a foam stabilizer selected from $C_4$-$C_{20}$ alcohols, $C_{12}$-$C_{18}$ amines, sorbitan esters, polysorbates, fatty acids, and combinations thereof.

15. The composition of claim 1, wherein the composition further comprises a preservative.

16. A method for suppressing and/or extinguishing a Class-B fire, the method comprising applying a foam composition of claim 1 either directly or indirectly to or onto a Class-B fire or directly or indirectly to or onto the fuel ahead of an advancing Class-B fire front or a potentially advancing Class-B fire front.

* * * * *